Jan. 7, 1947.   C. EISLER   2,413,960
MACHINE FOR SEALING GLASS BULBS
Filed Nov. 17, 1943   5 Sheets-Sheet 5
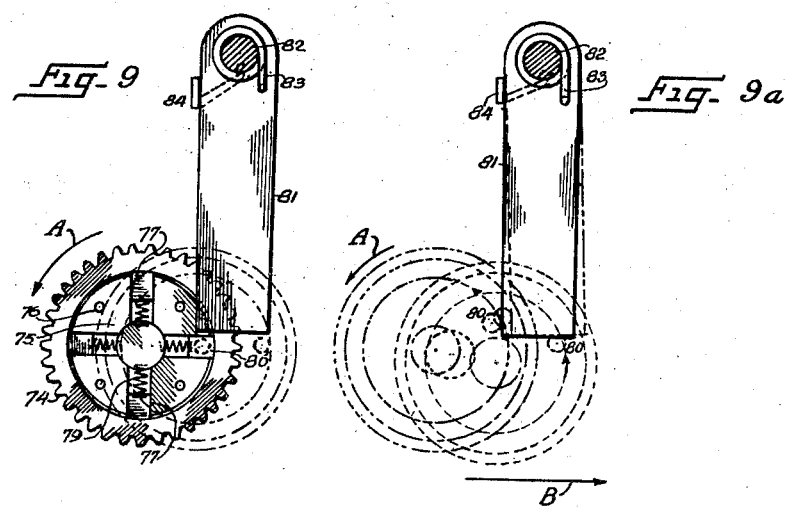
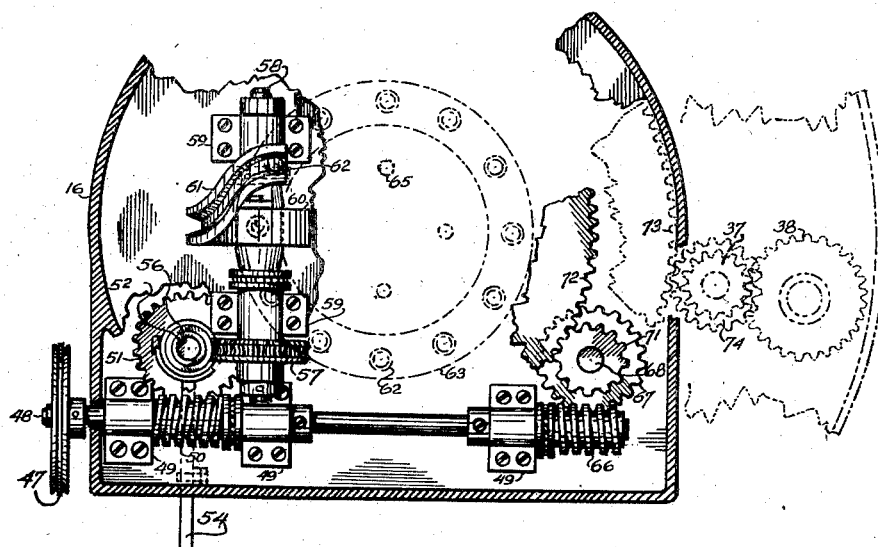
INVENTOR
Charles Eisler,
BY
Wm H Canfield.
ATTORNEY Patented Jan. 7, 1947

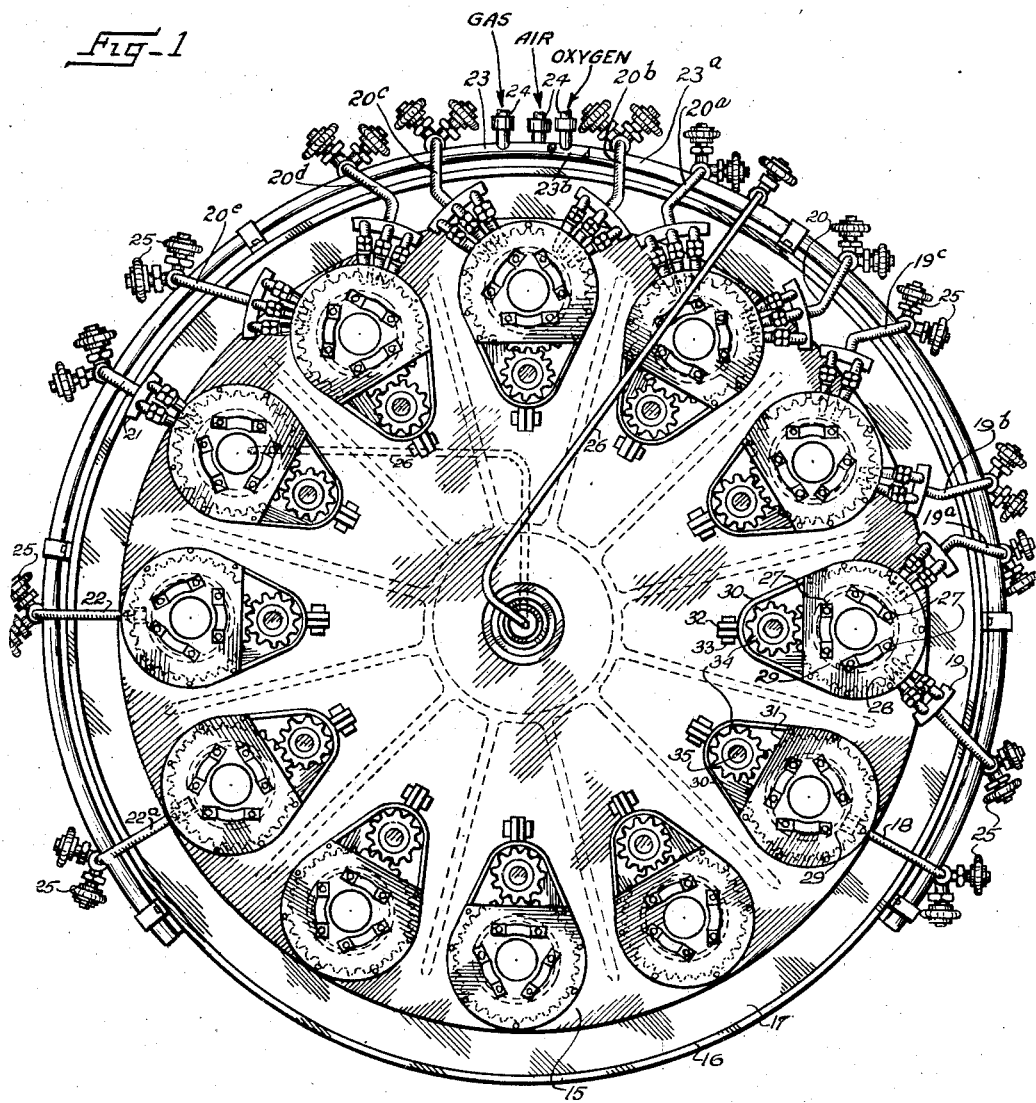

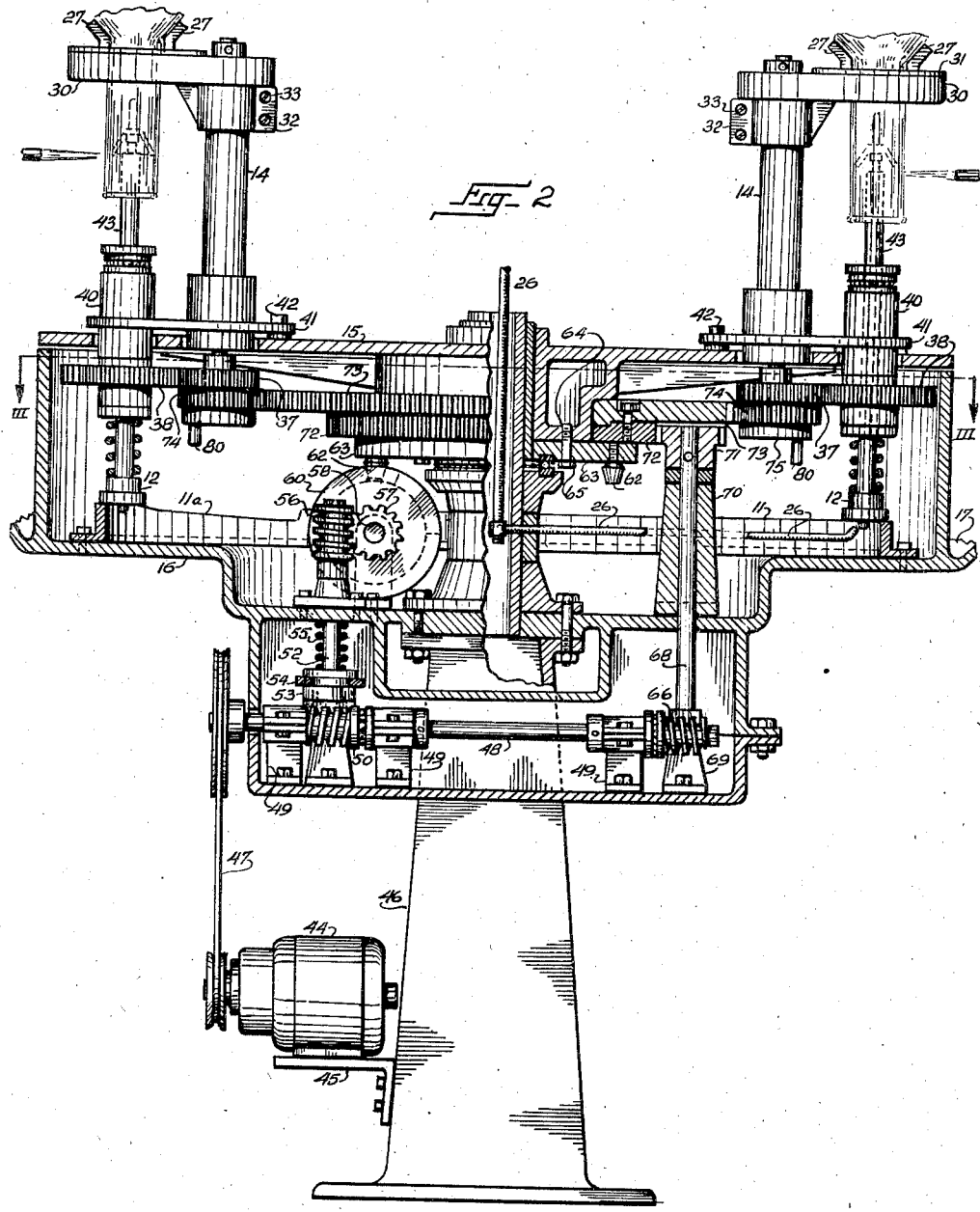

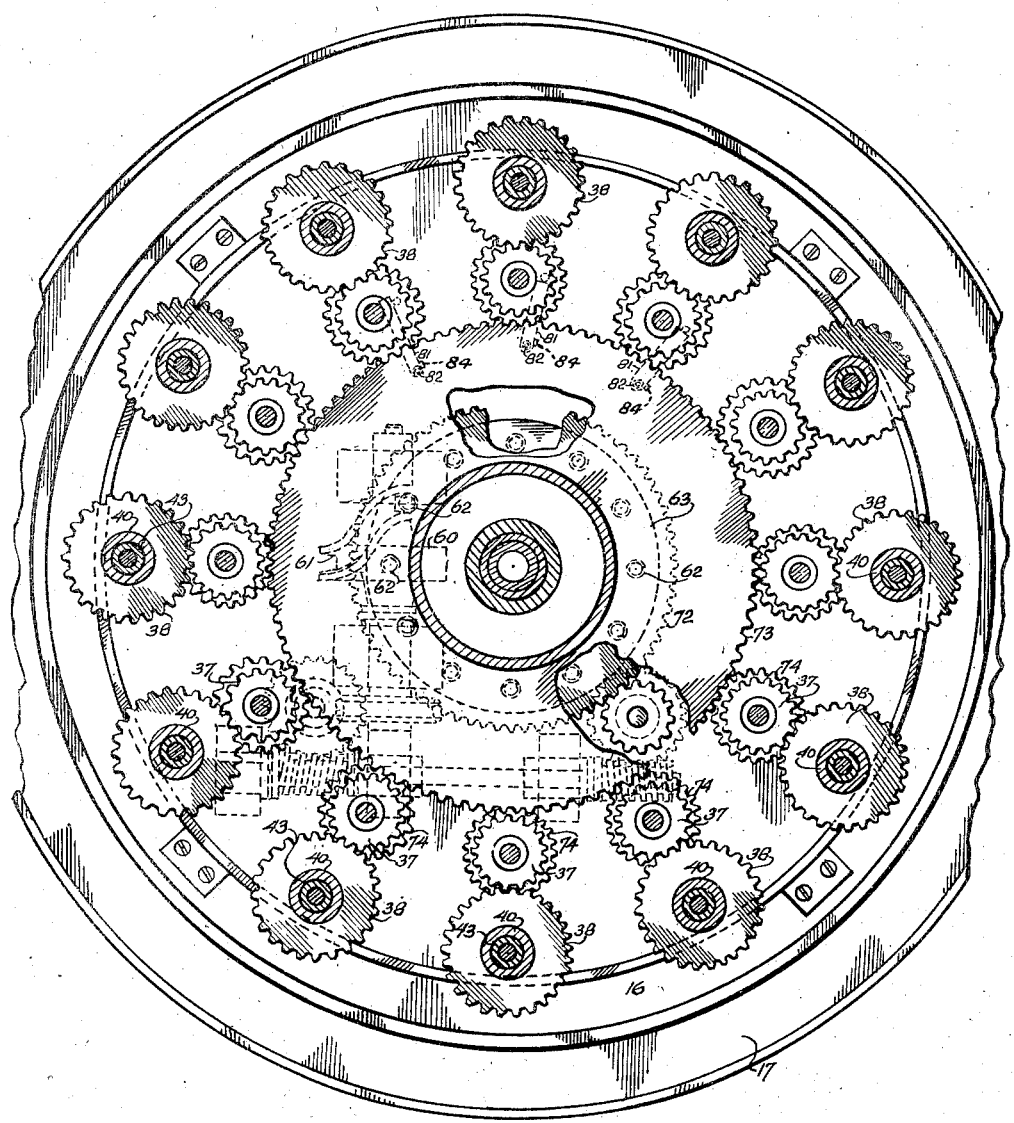

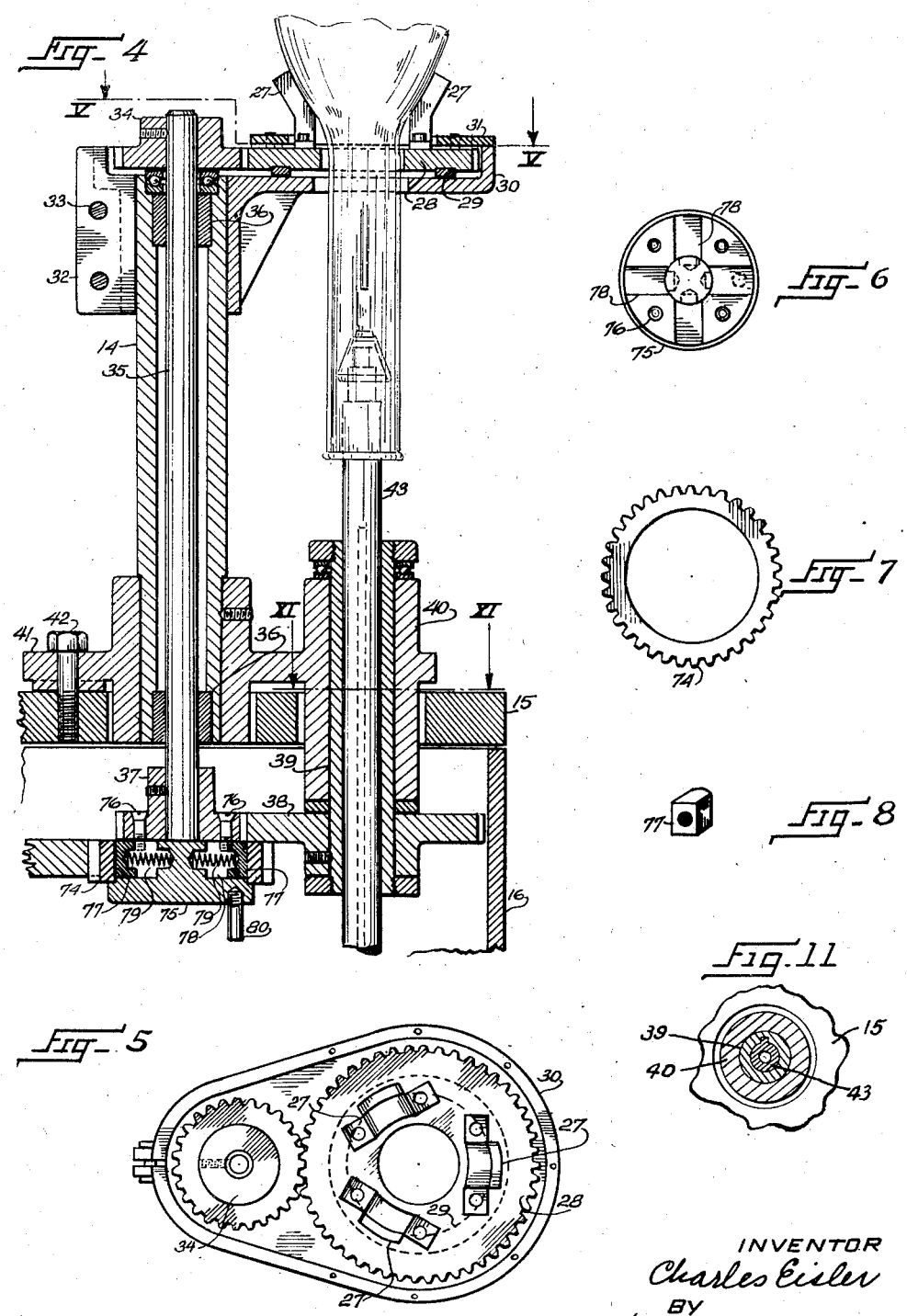

2,413,960

UNITED STATES PATENT OFFICE 2,413,960

MACHINE FOR SEALING GLASS BULBS

Charles Eisler, South Orange, N. J.

Application November 17, 1943, Serial No. 510,848

2 Claims. (Cl. 49—2)

This invention relates to an improved machine of the type that seals glass bulbs such as electric light bulbs and comprises a rotatable table or plate that supports rotating bulb supports and sealing heads arranged in sets, the whole being operated by means for intermittently rotating the plate and rotating the sets and halting the rotation of the sets at predetermined stations in the rotation of the plate.

The invention relates to the mechanical means that carries out the above-described steps. The machine enables the sealing to be accomplished in a short time thus increasing the capacity of the machine as compared to prior machines for the purpose.

The invention is illustrated in the accompanying drawings, in which Figure 1 is a plan view of the machine. Figure 2 is a sectional elevation with certain parts broken away to show details of construction. Figure 3 is a sectional view of the machine with the spider or top-plate removed taken on line III—III in Figure 2. Figure 4 is an enlarged sectional elevation of the support for the sealing head. Figure 5 is a plan view, taken from line V—V in Figure 4, of the overhead support of the bulb and means for rotating the same. Figures 6, 7 and 8 are views of parts of a clutch or friction release employed for temporarily halting the rotation of the sealing heads and bulb supports. Figs. 9 and 9a illustrate fragmentary top plan views of the action of the stopping mechanism and Fig. 10 is a composite, phantom plan view, partly sectional, supplementary to Fig. 2, and showing the actuating mechanism of the machine, and Fig. 11 is a horizontal sectional view taken on line XI—XI of Fig. 4.

The object of the machine is to provide mechanical means whereby the sealing of glass bulbs for incandescent lamps can be effected in the shortest possible time. Such bulbs are finished with a long neck into which is inserted a glass piece holding the filaments, this piece being called the stem. This stem is evolved from a piece having a round collar with flared skirt, the filaments being inserted in the collar and being subsequently fixed therein by fusing and closing the collar around them, the finished stem being provided with a small aperture in the flared skirt for the insertion and fusion of the small exhaust tube used for partially exhausting air from the bulb after sealing.

In order to assemble the bulb and stem the stem is placed by the operator onto the top of the sealing head while the bulb is positioned between cleats on the overhead support and lowered until the neck of the bulb has been passed over the stem, there being a slight clearance between the edge of the flared stem and the inside of the neck of the bulb. The neck of the bulb then projects a short distance below the stem. During the operation of positioning the bulb and the stem the sealing head and the bulb support remain rotationally stationary. As the bulb is passed on to the next station for pre-heating, both the bulb and the sealing head begin to revolve in unison and continue to do so as long as heat is being applied to them at this and subsequent stations. The flames from the burners effect fusion by imparting to the glass the required degree of plasticity and by simultaneously forcing the glass of the neck of the bulb inwardly against the edges of the flare. The superfluous end of the bulb neck then drops off and is broken by the operator. After annealing the fused end, the sealed bulb is taken from the machine and new separate bulb and stem are loaded on the sealing head and bulb support. The proper starting and halting of the rotation of the bulb and stem are the functions of the mechanism embodied in this application.

Referring to the drawings, 15 represents a top-plate or spider and 16 a stationary base provided with the annular trough 17 for receiving the broken ends of the bulbs as they drop off. The spider 15 is provided with the desired number, the drawings show twelve, of equally spaced sealing heads, heat being applied by nine sets of burners, one set to each sealing station, so that three stations have no heat applied to them, which enables the operator to remove the sealed bulbs as they come along, and to position fresh unsealed bulbs and stems in position. The amount of heat depends upon the nature and combination of the burners, the arrangement shown in Figure 1 therefore, although representative in a general way may, in practice, be subject to considerable variation. But in any case, the bulb has to pass the pre-heater 18, the cross-burners 19, 19a, 19b, 19c, the three-burner cross fires 20, 20a, 20b, 20c, 20d, 20e, and thereafter the diminished heat of the double burner 21. At this stage the neck of the bulb will, by reason of its excessive plasticity drop into the trough 17 and annealing is effected by the single burners 22 and 22a.

Gas, air and oxygen are supplied to the burners by the feed-pipes 23, 23a and 23b which have the connections 24 with the main supply tanks. The mixture can be regulated by the valves 25. In addition to the above gas feeds there is a special compressed air feed 26 of which more will be mentioned later.

Referring to Figures 2 and 4, it will be seen that the bulb is placed between the cleats 27 which are carried by and secured to the gear 28 rotatable on the ring bearing 29 in the overhead bulb support 30, the gear 28 being held against vertical displacement by the cover 31. The overhead support is adjustably secured to the column 14 by such means as the clamp flanges 32 which are sprung inward by the screw bolts 33 by means of which the support 30 can be radially aligned with the sealing head.

The gear 28 meshes with the pinion 34 which is secured to the vertical shaft 35. This shaft is rotatable in the bushings 36 and carries at its lower end the spur pinion 37 identical as to pitch and diameter with the upper pinion 34. Pinion 37 meshes with the gear 38 identical with gear 28 which is secured to sleeve 39 rotatable in the guide member 40, the guide member 40 being integral with the plate 41 secured to the spider 15 by such means as the bolts 42. The sealing head 43 is slidably keyed in the guide 39 and is therefore actuated by the gear 38. The tube 43 as shown in Fig. 4 of the drawings, is hollow and generally corresponds with the tube 19 shown in Patent No. 1,655,050, issued to me January 3, 1928.

By the above description it will be seen that the bulb seated in the overhead support and the flare poised on the sealing head thus rotate in unison, which is one of the essential requirements in the operation of sealing. The single column and cantilever support for the bulb insures non-interference of the supports with the burners since the supporting column is at all times stationary with reference to the sealing head. It is therefore possible to have a cross-fire from two opposed burners, provided, that the spacing of the sealing heads is sufficiently large to permit the installation of the burners.

As is the case in all sealing machines of this type, the sealing heads have axial as well as orbital rotation for they revolve about their own axes in order to insure uniform heating of the neck of the bulb in addition to revolving collectively with the spider on which they are mounted.

Referring to Figure 2 it is seen the sealing machine is driven by the motor 44 mounted on the bracket 45 which is secured to the support 46. The motor drives the horizontal shaft 48 by the belt 47. The shaft 48 is journalled in the bearings 49 and is equipped wtih the worm 50 which drives the worm gear 51 keyed on the vertical shaft 52, this shaft being disconnected by the pin-clutch 53 operated by the clutch lever 54 and urged into engagement by the spring 55.

The vertical shaft 52, which extends upward in the base 16 has keyed on it the worm 56 which drives the worm gear 57 on the shaft 58 journalled in the bearings 59. On shaft 58 is mounted the barrel cam 60 provided with the shoe 61 which, at every revolution of the cam 60 engages one of a series of pins 62 of the disc 63 secured to the hub 64 of the spider 15 by such means as the screws 65. The number of pins carried by the disc corresponds to the number of sealing heads on the spider or plate, the throw of the cam being such that the spider is partially rotated to the extent of the arcuate distance between two consecutive sealing heads. This mechanism provides an intermittent or step-by-step movement to the plate or spider. As the arcuate length of the cam segment comprises only a fraction of the entire periphery of the cam it follows that for the remainder of the revolution of the cam the sealing head remains stationary and the bulbs are exposed to the action of the burners for a corresponding length of time.

The rotation of the sealing heads is affected in the following manner: The shaft 48 has the worm 66 keyed on it, driving the worm wheel 67 mounted on the vertical shaft 68 which is journalled in bearings 69 and 70. The spur gear 71 is keyed on the shaft 68 and meshes with the gear 72 journalled on the hub 64 of the spider 15; the gear 72 is secured to the super-imposed gear 73 so that both these gears rotate in unison. Gear 73 meshes with the ring gear 74 which is freely journalled on the hub 75. The hub 75 is secured to the pinion 37 on shaft 35 by the screws 76. It has the brake-shoes 77 guided in the grooves 78 and urged into frictional contact with the ring gear 74 by the coil springs 79, the friction being normally sufficient to entrain the hub 75 and with it the gear pinion 37 and thus effect the rotation of the bulb support and sealing heads. After the sealed bulb is subjected to the final annealing process, rotation of the sealed bulb is discontinued without interfering with the intermittently rotative progress of the plate or spider so that the operator can remove the sealed bulb from the support and install an unsealed bulb and stem in its stead.

To this end the hub 75, which is carried by the pinion 37, is provided with a depending projection such as the stop pin 80. At the stations where temporary stopping of the rotation of the bulb is required, there is located a horizontally disposed and radially outwardly extending stop lever 81, see Figure 3, swivelled on the shaft 82 which is fixedly secured to the base 16. The stop lever is yieldingly maintained in its normal position by the coil spring 83 and held against the stop 84. (See Figure 9.) In Figure 9 the direction of rotation of the gear 74 and its direction of travel with reference to the stop has been indicated by arrows. It is seen that when the hub 75 and the gear 74 have advanced to the position shown in full lines, the stop pin 80 will contact the end of the lever 81 and will cease from rotating, and thereby stop the rotation of the sealing head and of bulb support. The gear 74, which is journalled on the hub 75 however, will continue to rotate in co-operation with the gear 73 and will therefore rotate with reference to the pinion 37 by overcoming the friction of the brake shoes 77. As the hub 75 advances, the stop pin 80 will eventually reach the position shown in broken lines and will immediately thereafter be disengaged from the end of the stop lever 81, and the sealing head and bulb resume their rotation accordingly.

The above described function will take place when the stop pin 80, at the moment of contact, happens to be in position shown in the drawings, in which case the stop lever 81 will not be displaced. This ideal condition, however, does not always prevail. The stop pin 80, for instance, at the moment of contacting the stop lever may already have passed the outer extremity of the lever, and the bodily progress of the gear 74 and hub 75 will then cause it to bear against the edge of the lever in the manner shown. The lever 81 will thereby be turned to the position shown in dotted lines and will presently be disengaged from the lever without having stopped the rotation of the hub 75. However, upon completion of the rotation of the hub it will contact the lever again, this time at its radially outer edge, as was the case in the first instance, and the rotation of the sealing head and bulb support then will be stopped, although the period of its stopping will be shorter than in the first instance. It will be noted that with the ring gear 74 rotating in a counterclockwise direction as indicated by the circular arrow in Fig. 9 during the orbital movement of the gear 74 and associated parts to the right, that the pin 80 will engage the lever 81 and will preclude rotation of the hub 75 until, in the orbital movement of the ring gear 74 and associated parts they have been carried to the right past said lever. The lever is held normally against stop 84 which prevents its clockwise rotation responsive to the rotation of the ring gear 74; should the stop pin 80 contact the lever 81 at a point which in Fig. 9a would be in the lower left hand corner of the lever, then on the continued rotation of the ring gear 74, the lever 81 would simply be shifted to the dotted line position thereof, while the hub 75 continues its counterclockwise rotation. However, on the continued orbital movement of the ring gear in the direction indicated by the straight arrow in said figure, the pin 80 would in the course of rotation of member 74, be carried against the lever 81 at the flat bottom face of the latter, and would thereby prevent rotation of the hub 75 until, in the further orbital rotation of the ring gear 74 and associated parts in the direction indicated by the straight arrow, the pin 80 is carried past the lever 81. The circular arrows indicating the counterclockwise rotation of ring gear 74 are designed by the reference letter "A." The direction of continued orbital movement of the ring gear above referred to, is indicated by the straight arrow which is designated by the reference letter "B." The removal of the superfluous length of the neck of the bulb takes place before the operation of annealing at the station indicator by burner 21 in Figure 1, is accomplished in the usual way by compressed air which is admitted at the bottom of the sealing heads by the air duct 26, the air emerging at the top of the head and forcibly effecting the severance of the superfluous part of the neck at its juncture with the fused edge of the flare. The wall of the neck at this stage being of greatly reduced thickness, the severed part of the neck which encompasses the sealing head is then broken by the operator and the fragments collected in the trough 17 which surrounds the main base 16.

At its lower extremity the sealing head 43 is provided with the flanged collar 12 riding on the cam track 11, by the drop 11a of which causing the internal ball-grip on the exhaust tube of the flare to relax, thereby enabling the operator to remove the sealed bulb from the sealing head. The ball grip on the exhaust tube may be such as is shown in detail in Patent No. 1,655,050, issued to me January 3, 1928—see particularly, Figs. 3, 4 and 5 of said patent. Compressed air for severing the superfluous length of the neck of the bulb is fed to the sealing head by the ducts 26, leading from the air supply pipe, to the bottom of the sealing head in the manner shown in Fig. 2.

The duct 26, which in the drawing is shown as leading to the sealing head at the extreme right, in order not to obscure other parts at the left, preferably goes to the left, to the station corresponding to that of burner 21, as shown in Fig. 1. The duct 26 is shown in Fig. 1 as being disposed at a higher plane than the bulbs in passing over the top of the machine to clear the latter; this arrangement, however, may be varied by having the duct 26 pass through the side of the bottom of the base 16.

I claim:

1. In a machine for sealing glass bulbs, a guide member, a sleeve rotatably journalled in said guide member, a sealing head slidably keyed to said sleeve, a gear secured to said sleeve, means to axially slidably reciprocate said head in said sleeve, a vertical shaft, means to rotatably journal said shaft in said machine in parallel spaced axial relation to said sealing head, a pinion secured to said shaft in mesh with the gear of said sleeve, a hub fixed to said pinion, a ring gear positioned on said hub, means on the hub engaging the ring gear to normally hold the hub and ring gear together for rotation in unison, means engaging said ring gear to rotate the latter and thereby to rotate the pinion and the sealing head, stop means carried by said hub, means on said machine adapted to be selectively engaged by said stop means to hold the hub stationary during the continued rotation of the ring gear, means for supporting a glass bulb in axial alignment with said head, and means engaging said shaft and said bulb supporting means for rotation of the bulb in unison with the shaft.

2. In a machine for sealing glass bulbs, a guide member, a sleeve rotatably journalled in said guide member, a sealing head slidably keyed to said sleeve, a gear secured to said sleeve, means to axially slidably reciprocate said head in said sleeve, a vertical shaft, means to rotatably journal said shaft in said machine in parallel spaced axial relation to said sealing head, a pinion secured to said shaft in mesh with the gear of said sleeve, a hub fixed to said pinion, a ring gear positioned on said hub, means on the hub engaging the ring gear to normally hold the hub and ring gear together for rotation in unison, means engaging said ring gear to rotate the latter and thereby to rotate the pinion and the sealing head, stop means carried by said hub, levers pivotally mounted on said machine adapted to be selectively engaged by said stop means to hold the hub stationary during the continued rotation of the ring gear, means engaging said levers to normally hold them in a predetermined position under tension, means for supporting a glass bulb in axial alignment with said head, and means engaging said shaft and said bulb supporting means for rotation of the bulb in unison with the shaft.

CHARLES EISLER.